(12) United States Patent
Agre et al.

(10) Patent No.: US 6,208,247 B1
(45) Date of Patent: Mar. 27, 2001

(54) WIRELESS INTEGRATED SENSOR NETWORK USING MULTIPLE RELAYED COMMUNICATIONS

(75) Inventors: Jonathan R. Agre, Oak Park; Loren P. Clare, Thousand Oaks; Henry O. Marcy, 5th, Camarillo; Allen J. Twarowski, Westlake Village; William Kaiser, Los Angeles, all of CA (US); Wilmer A. Mickelson, Cedar Rapids, IA (US); Michael D. Yakos, Cedar Rapids, IA (US); Christian J. Loeffelholz, Cedar Rapids, IA (US); Jonathan R. Engdahl, Chardon, OH (US)

(73) Assignee: Rockwell Science Center, LLC, Thousands Oaks, CA (US)

( * ) Notice: Subject to any disclaimer, the term of this patent is extended or adjusted under 35 U.S.C. 154(b) by 0 days.

(21) Appl. No.: 09/135,762

(22) Filed: Aug. 18, 1998

(51) Int. Cl.$^7$ ........................................... G08B 1/08
(52) U.S. Cl. .............. 340/539; 340/854.6; 340/870.16; 340/870.21; 340/511; 340/531; 340/825.69; 340/825.72; 340/825.5
(58) Field of Search .................... 340/539, 531, 340/511, 825.69, 825.72, 825.5, 825.22, 854.6, 870.16, 870.18, 870.21, 870.07, 870.09

(56) References Cited

U.S. PATENT DOCUMENTS

| | | | |
|---|---|---|---|
| 4,649,524 | 3/1987 | Vance | 367/13 |
| 4,812,820 | * 3/1989 | Chatwin | 340/518 |
| 4,855,713 | 8/1989 | Brunius | 340/506 |
| 4,951,029 | * 8/1990 | Severson | 340/531 |
| 5,241,542 | 8/1993 | Natarajan et al. | 370/95.1 |
| 5,247,564 | * 9/1993 | Zicker | 340/426 |
| 5,295,154 | 3/1994 | Meier et al. | 375/1 |
| 5,428,636 | 6/1995 | Meier | 375/202 |
| 5,475,687 | 12/1995 | Markkula, Jr. et al. | 370/85.1 |
| 5,553,076 | 9/1996 | Behtash et al. | 370/95.3 |
| 5,659,195 | 8/1997 | Kaiser et al. | 257/415 |
| 5,854,994 | 12/1998 | Canada et al. | 702/56 |

OTHER PUBLICATIONS

Bhatnagar et al., "Layer Net: A New Self–Oranizing Network Protocol", *IEEE Military Communications Conference Record*, vol. 2, Jan. 1990, pp. 845–849.

Dong et al., "Low Power Signal Processing Architectures for Network Microsensors", University of California, Los Angeles, *ISLPED97, International Symposium on Low Power Electronics and Design*, Jan. 1998, p. 1.

Lin et al., "Wireless Integrated Network Sensors (WINS) for Tactical Information Systems", Rockwell Science Center, Thousand Oaks, California, Jan.1998.

C. David Young, "A Unifying Dynamic Distributed Multichannel TDMA Slot Assignment Protocol", *Rockwell International Working Paper*, Oct. 25, 1995, pp. 1–29.

Norman Abramson, "The Throughput of Packet Broadcasting Channels", *IEEE Transactions on Communications*, vol. Com–25, No. 1, Jan. 1977, pp. 117–128.

(List continued on next page.)

Primary Examiner—Donnie L. Crosland
(74) Attorney, Agent, or Firm—Koppel & Jacobs

(57) ABSTRACT

Wireless integrated miniature sensing stations which can be organized into a communicating network allow sensitive detection and analysis of vibration, infrared radiation, sound, or other physical signals indicative of an intruder or condition to be monitored over a wide area. The sensing stations operate on low power and include a sensor or sensors, a digital signal processor, a microprocessor, and a wireless transceiver for communication. Network communication is facilitated by multiple relayed transmissions from station to station.

9 Claims, 8 Drawing Sheets

OTHER PUBLICATIONS

C. David Young, "USAP: A Unifying Dynamic Distributed Multichannel TDMA Slot Assignment Protocol", *IEEE Military Communications Conference Record*, vol. 1, Jan. 1996, p. 235.

Burstein et al., "Low Power Wireless Communication and Signal Processing Circuits for Distributed Microsensors", *Proceedings of the International Circuits and Systems Syposium, ISCAS 97*, Jun. 1997, 5 pages.

Ephremides et al., "A Design Concept for Reliable Mobile Radio Networks with Frequency Hopping Signaling", *Proceedings of the IEEE*, vol. 75, No. 1, Jan. 1987, pp. 56–73.

Bult et al., "Low Power Systems for Wireless Microsensors", *Proceedings of the International Symposium on Low Power Electtonics and Design*, Monterey, CA, Aug. 12–14. 1996, 5 pages.

Bult et al., "Wireless Integrated Microsensors", *Solid State Sensor and Actuator Workshop*, Hilton Head Transducers Conference, Jun. 2–6, 1996, 6 pages.

* cited by examiner

WIRELESS INTEGRATED SENSOR NETWORK USING MULTIPLE RELAYED COMMUNICATIONS

BACKGROKUND OF THE INVENTION

1. Field of the Invention

The invention relates to wireless telemetry, security networks, or monitoring of physical conditions. In particular, the invention relates to the remote detection, monitoring or tracking of vehicles, personnel, or other physical conditions, for example in industrial equipment monitoring and control systems.

2. Description of the Related Art

Sensor networks have numerous applications, such as security, industrial monitoring, military reconnaissance and biomedical monitoring. In many such applications it is either inconvenient or impossible to connect the sensors by wire or cable; a wireless network is preferable.

Seismic sensors, for example, can be used to detect intrusion or movement of vehicles, personnel or large earth masses. For example, U.S. Pat. No. 4,649,524 to Vance (1987) describes an integrated acoustic network which provides warning of impending groundfall in underground mines. The system includes a plurality of geophones which derive acoustic signals from which the source of seismic disturbances is located, and an array of high frequency piezoelectric sensors which pick up signals from small ground disturbances which precede groundfall.

The detection of vehicles and personnel is more difficult than detecting large signals, as from earthquakes or movement of earth masses. Quiet vehicles and personnel movement produce seismic signals which may not be detectable by geophones at ranges of more than tens of meters, particularly in the presence of background noise. The reliable detection or tracking over large areas thus requires very large numbers of sensitive detectors, spaced closely. The placement of such large numbers of conventional detectors is generally inconvenient, expensive and time consuming if they must be wired for communication or power supply. A wireless network of numerous sensitive, low cost, low powered sensor stations would be more desirable.

Wireless networks of sensor stations, however, present several technical challenges. Wireless communication generally requires higher power than wired communication over the same distance; but an individual wireless sensor station requires a limited, self-contained power supply, which usually dictates that it conserve energy. The resulting low power constraint severely limits the range of wireless transmission by an individual sensor station. There are other drawbacks: wireless communication is vulnerable to jamming or unintentional interference. It is also overt in that the source of a transmission can be located by a hostile agent. If control or data processing occurs at a central location, then the entire network is vulnerable to failure of the central processor. Such an architecture has low reliability and cannot easily survive in a hostile environment. Wireless communication among large numbers of densely placed sensor stations requires sophisticated multiplexing or scheduling to avoid cross-interference. If the stations are placed randomly or some have initially unknown locations, it is difficult to learn the topology of the network so that multi-hop communications (communications relayed among multiple stations) may be scheduled.

Wireless security devices, such as wireless alarms, are widely available. Such systems generally employ only one-way wireless communication. For example, Brunius, U.S. Pat. No. 4,855,713 describes a system in which one-way alarm transmitters report to a central processing unit (CPU). The system even permits the CPU to detect new alarm transmitters and add them to the programmed system. Such systems are limited by one-way communication from the alarms to the central control. This limits their flexibility and utility, because it is impossible to remotely reprogram or adapt the network of sensors to a changing environment or a new purpose. An additional problem in the patented system is that the alarm transmitters must each have sufficient power to be received by the central receivers, or a repeater must be provided. This requires relatively high power to cover a significant area. The number of possible transmitters is also limited to the number of communication channels available; otherwise, simultaneous transmissions on the same channel will interfere with one another and be unintelligible. This system cannot be extended to permit a truly distributed, multihop network containing very high numbers of densely placed, low power sensor stations.

Another shortcoming of prior detection and alarm systems is that very little signal processing of the alarm condition is available at the sensor station, especially with wireless systems. This makes it difficult to distinguish among relevant, urgent or irrelevant signals unless the entire signal is transmitted, which would require a large expenditure of energy.

SUMMARY OF THE INVENTION

The invention is a miniature electronic sensing station, adaptable for two-way wireless communication in a network with other similar sensing devices, for sensing events such as an intrusion, vehicle movement, a change in status of some industrial process, or any physical change that can be detected by the sensors. Deployment in a network allows monitoring of the spatial extent and distribution of the sensed condition. Each sensing station in the network includes one or more sensors; a digital signal processor for analyzing the data from the sensors; a programmable microprocessor for making decisions based upon the analyzed data, and for controlling communication functions; a power supply; and a wireless transceiver, for communicating with other sensing devices in the network and with users. All of the components of the sensing station are enclosed in a single package and collectively constitute a "node" of the network. In a typical application a network of such nodes may contain large numbers of such sensing nodes (more than 100), spaced fairly closely together (typically within less than 100 yards). The nodes can be placed randomly. They could, for example, be dropped from an aircraft or a ship; they could be placed manually. It is not necessary for each node to have a known location before startup; the nodes are programmable to organize themselves in a distributed fashion. Control of the network is distributed among the nodes; no indispensable central controller is necessary.

The invention preferably is used in a large network of wireless nodes, each of which is very compact and has a very limited power supply. The limitation on available power makes low power consumption an objective at every level of the invention. The practical implementation of this network architecture depends on several features which cooperate in a synergistic manner to allow effective, low powered sensing and wireless communication. At the node level the invention uses low powered sensors, low powered digital signal processing, a micropower programmable microprocessor, and a low powered RF transceiver, all cooperating in an architecture well adapted to conserve energy. At the network level, the design also conserves energy by fully utilizing the large number of nodes and low powered short range multi-hop communication in a web-like network.

Two techniques are used at the node level as energy conserving motifs: (1) circuits which are not required to be active during a time window are held in an inactive "sleep mode" so as to conserve energy, and (2) whenever possible, data is processed, compressed or summarized before transmission. This latter technique is effective because wireless transmission consumes vastly more energy than computation, especially where low power complementary metal oxide semiconductor (CMOS) circuitry can be used for computation.

The sensor or sensors may be of several types, such as seismic, acoustic, infrared, thermal, optical, magnetic or mechanical (for example, an accelerometer). The invention includes realizations of micro-seismic and micro-infrared sensors, but other sensors could also be used, as long as they consume low power and are small.

The sensor may include a sensing device that produces an analog output indicative of the sensed condition, coupled with an analog-to-digital converter (ADC) that digitizes the analog output. The ADC operates at low duty cycle and is preferably a $\Sigma-\Delta$ converter, consuming very low power. The ADC displays low switching activity in the absence of a change in input signal level. It thus operates at minimum power for normal operation in the absence of a "threat" signal.

The digitized signal from the ADC is processed by a low power digital signal processor which analyzes power spectral density in selected bands. The power spectral density of the signal is then compared to a profile and a decision is made based on the result of the comparison. When the spectral density of the signal exceeds the threshold profile, the output of a series of comparators causes the programmable microprocessor to "wake up" and go from its power conserving state to a higher power operating state. The microprocessor then decides what action to take: whether to perform more signal processing and analysis, to activate the transmitter, to transmit the spectral density of the signal, to transmit the raw signal data or perhaps to do nothing, depending on the signal and the programming of the microprocessor.

The microprocessor is preferably adapted to conserve power by not continuously operating in the usual sequence of instruction fetch and decode operations. Rather, it is only activated for critical, low duty-cycle windows and when a decision is required based on an event.

The wireless transceiver allows the node to communicate with other nodes (including user nodes, which provide communication with the user) when it is enabled by the microprocessor. The invention preferably uses low power radio frequency (RF) circuitry. In one embodiment, the RF transceiver is designed to consume minimal power when not in demand, but to turn on and off quickly as required.

Power is also conserved at the network level by organizing the nodes to communicate by a multihop method, relaying messages through a series of short, low power RF transmissions or "hops," rather than by long, high power jumps. The nodes may be programmed to organize themselves into a communication topology so as to enable wireless communication throughout the network, using a time division multiple access (TDMA) scheme. TDMA is preferred because it allows transceivers to remain in a power conserving, off state for periods of time when not in use, turning on only for short bursts. Because each node has a very short range, multiple nodes may use the same channel simultaneously, so long as the simultaneous users are out of range of one another. This enables reuse of wireless communication channels and makes it possible for a large number of nodes to communicate on a relatively small number of channels.

The ability to use two-way wireless communication enables the network to respond to changes in environment or changes in command priorities. Each node can be reprogrammed by wireless transmissions relayed through the network. For example, new spectral profiles can be entered, or nodes can be reprogrammed for a higher duty cycle during critical periods of activity. Loss of nodes or the addition of new nodes can be accommodated easily.

The invention also benefits from a high degree or integration of the components--sensors, micropower control processor, ADC, wireless transceiver, and signal processor-into a compact package. Relative ease of manufacture and compact, durable packaging make practical the deployment of large numbers of short range, densely placed wireless sensor nodes.

DETAILED DESCRIPTION

The invention is a highly integrated, miniature electronic sensing station which is specially adapted for use with other such sensing stations in a wireless, communicating network. The station and the network of which it is a part can be used for sensing conditions or events such as an intrusion, vehicle movement, a condition or change in status of some industrial process, or any physical change or condition which can be detected by the sensors. Because they function as members of a network, the sensing stations will hereinafter be referred to as "nodes" in recognition of their similarity to nodes in a communication network or graph.

Figure 1:
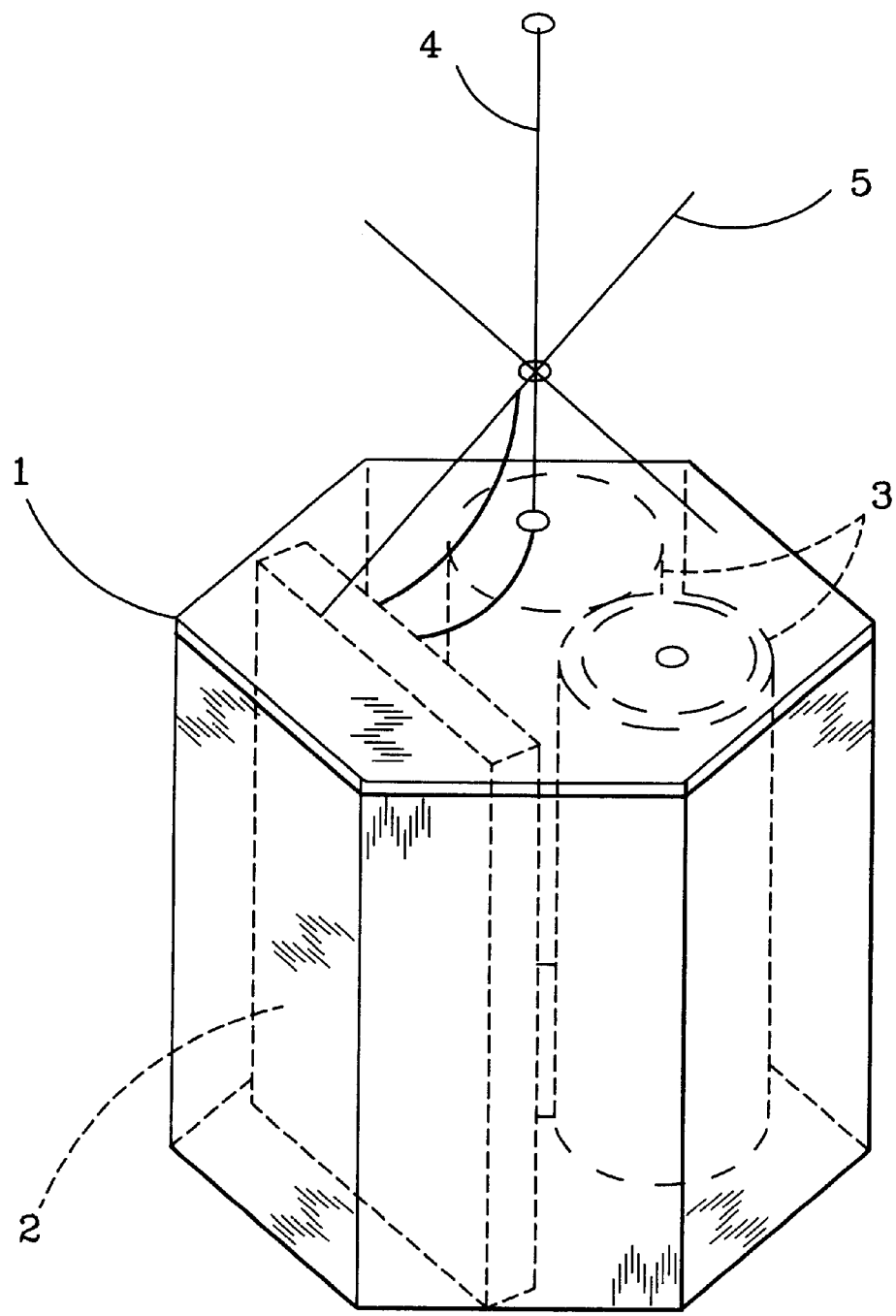
FIG. 1 is a perspective view of one embodiment of an electronic sensing station or "node" of the invention.

FIG. 1 shows one possible realization of a single device or node, as it might be deployed in terrain. The node includes an enclosure 1, which houses and provides environmental protection for the functional components (shown in phantom) including circuitry 2 and power supply (batteries) 3. An antenna 4 is mounted atop the enclosure 1, for transmitting and receiving radio signals. Although the antenna 4 is shown as a vertical dipole with artificial groundplane, other configurations may be used, including internal covert antenna loops or even an integrated antenna element. The exterior shape of the node housing 1 could also be varied to take almost any shape, as the application demands. The dimensions of the housing 1 can be varied, with the minimum size limited only by the degree of integration and miniaturization of the circuitry 2 and power supply 3.

Figure 2:
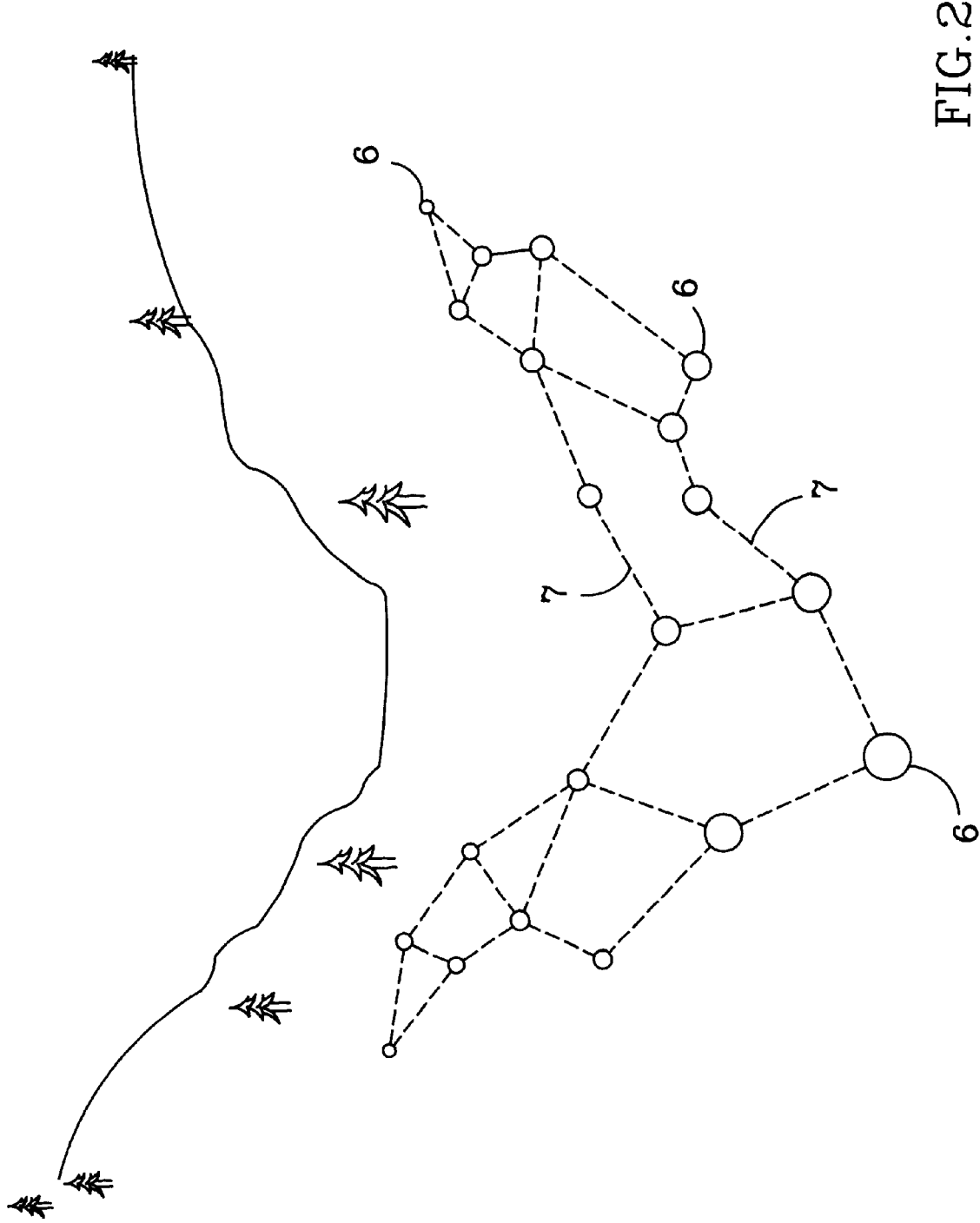
FIG. 2 is a perspective view of a network of nodes deployed in a landscape.

FIG. 2 shows an example of how the nodes might be deployed in terrain. The nodes can be dropped, for example from an aircraft, a ground vehicle, or even by walking personnel. Individual nodes 6 are scattered in a more or less random fashion, but are able to establish wireless radio communication, as indicated by the dotted lines 7, collectively forming a network.

Figure 3:
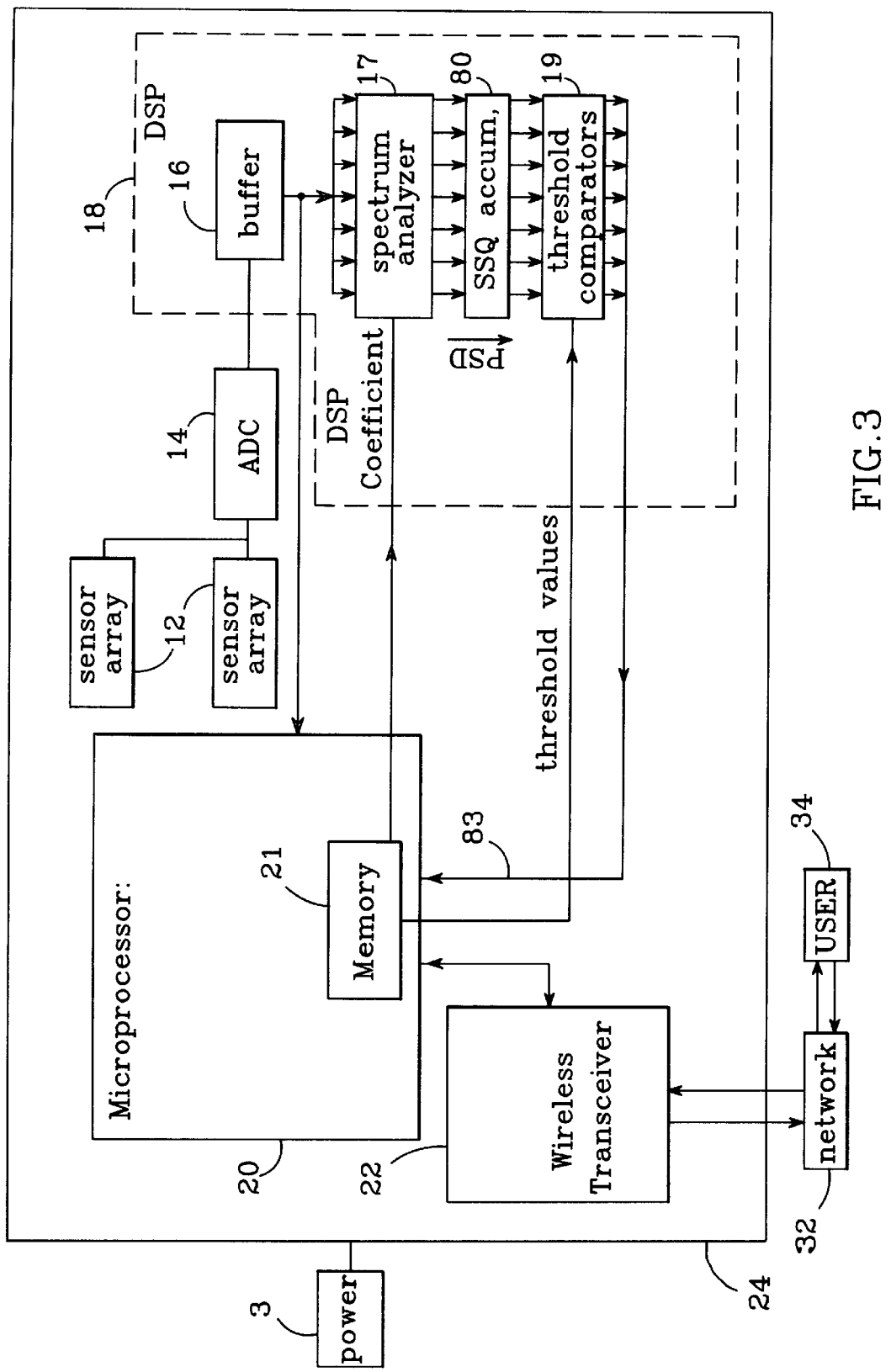
FIG. 3 is a block diagram showing the architecture of an exemplary node.

FIG. 3 shows an architecture for an individual node. Local environmental conditions or changes are sensed by a sensor or sensor arrays 12. In the typical case in which the sensor(s) produce an analog signal or signals, an analog-to-digital converter (ADC) 14 is provided to digitize the data from the sensors. The data is stored for processing in a buffer memory 16. A digital signal processor (DSP) 18 (which preferably includes a buffer 16, a spectrum analyzer 17, a multi-channel sum of squares accumulator 80 and threshold comparators 19) filters and analyzes the stored data to improve signal-to-noise ratio and extract information regarding the amplitude and spectral characteristics of the sensor data. After filtering, the DSP 18 compares the characteristics to user-programmed profiles, and presents the results of the comparison to a microprocessor 20. The microprocessor 20 makes decisions based upon the information from the DSP 18. For example, if certain low frequency signals are detected, indicating a vehicle, it may cause a wireless transceiver 22 to transmit a warning. The microprocessor 20 can if required perform additional signal processing and analysis (for example, a Fourier transform analysis) of the data, or by reconfiguring DSP 18 to more closely examine specific spectrum bands. In addition, the microprocessor 20 can be responsible for controlling and scheduling communications with other nodes and/or users, or a second microprocessor can be provided for controlling a wireless transceiver 22 to perform those functions.

Many of the functions of the node, including signal processing, decision making and communication management, could be performed by separate dedicated microprocessors. Although the invention encompasses multiple microprocessor embodiments, for the sake of simplicity the figures show only one microprocessor 20 performing various functions. As used herein, microprocessor 20 should be understood to symbolize and refer to at least one microprocessor.

The transceiver 22, controlled by microprocessor 20, provides communications with a network 32 of other nodes and with a user or users 34. Communications are two-way: data (spectral or time domain) or instructions can be transmitted or received. The received data or instructions are stored by the microprocessor 20 and can be used to modify the programming of either the microprocessor 20 or the DSP 18. The invention is preferably used in a network of numerous nodes with limited power supplies: typically battery or solar cell. Low power consumption is thus preferred. At the node level power consumption is reduced by using circuitry which can frequently be held in an inactive "sleep mode" when not immediately required. The nodes also conserve energy by summarizing or analyzing data and then transmitting only the summary or result, rather than the raw data. This technique, sometimes call "pre-processing," is effective because computation can be performed (for example, by CMOS logic) with much lower power consumption than wireless transmission of data. At the network level, communications are preferably scheduled and routed to exploit low powered, multiple hop relayed communications.

In the preferred embodiment, the several component subsections of the node (the sensors 12, the ADC 14, the DSP 18, the microprocessor 20 and the wireless transceiver 22) are all fully integrated on a chip 24, powered by a power supply 3 and housed in an enclosure 1. Such integration enables low cost manufacture and an extremely compact package. However, greater or lesser degrees of integration are possible and the resulting nodes are also within the scope of the invention.

The detailed operation and structure of the node's subsections will be discussed in sequence, beginning with the sensors 12.

A. The Sensors:

The sensor system must identify a signal in the presence of environmental noise. Source signals (such as seismic, infrared, thermal, optical, acoustic, mechanical, and others) all decay in amplitude rapidly with distance from the source. To increase the detection range, sensor sensitivity must be increased. In addition, due to the fundamental limits of background noise, a maximum detection range exists for any sensor. Thus, it may be desirable to obtain the greatest sensitivity and to utilize compact sensors that may be distributed both widely and densely. In addition, in some applications it is desirable to integrate multiple sensors (with varying characteristics) with the signal processing, control, and wireless transceiver portions of the node, thus increasing the information available from that node.

Integration of the sensors with the other electronics is preferably accomplished by conventional "flip-chip" bonding. In the "flip-chip" process a sensor die and a CMOS interface die are each fabricated. The CMOS interface die is then flipped and bonded to the sensor die, which typically includes the bulk micro-machined sensor structures. This process allows modular processing: the fabrication of the sensor die (with materials incompatible with CMOS processing) is separated from CMOS fabrication. Thus, high performance piezoelectric and pyroelectric actuator and sensor materials may be integrated with CMOS measurement and control systems without interference with CMOS fabrication.

Typical sensors which could be used in the invention are disclosed by U.S. Pat. No. 5,659,195 to William J. Kaiser. This patent discloses, for example, a CMOS integrated microaccelerometer which could be used as a seismometer or vibration sensor. Integrated microacoustic sensors and thermoelectric sensors are also disclosed by the patent. Another thermal infrared sensor suitable for use with the invention is a high sensitivity thin-film radiation thermopile sensor described by David T. Chang in "Micropower High-Detectivity Infrared Sensor System," *Solid State Sensor and Actuator Workshop (Technical Digest)*, TRF cat. no. 98TRF-001, Lib. of Congress no. 98-60214, ISBN no. 0-9640024-2-6, pp. 205–208 (1998). Such devices are well suited to large scale integration with the other components of a node of the present invention; however, non-integrated sensors such as geophones, acoustic detectors, thermal sensors, photoelectric detectors, or even mechanical transducers can be employed either together with or as alternatives to integrated sensors.

B. The ADC:

In a typical embodiment of the invention shown in FIG. 3 the sensors produce analog signal outputs. An ADC 14 must then be provided to convert the sensor output to digital form for processing. A Σ–Δ architecture is suitable for use in the ADC for the invention, as it provides low power and low noise operation. Although the low power constraint discourages the use of flash, pipelined, and sequential approximation architectures, any ADC architecture could be used provided that it has sufficient bandwidth and resolution for the sensor data of interest, and further provided that the ADC power consumption is not inconsistent with available power and power supply lifetime considerations.

C. The DSP:

The DSP 18 analyzes the amplitude and spectral characteristics of the signal acquired by the sensors, while improving signal-to-noise ratio for signals within spectral regions of interest. The DSP 18 can then compare amplitude and spectral characteristics of the signal with spectral profiles (either stored or communicated from a network). The results of the comparison, the spectral data, and the raw signal data are made available to the microprocessor 20. This data can be combined by the microprocessor 20 with data from other sensors, if multiple sensors are provided on the node, to extract clues as to the identity, number, size, distance and direction of the signal source (or sources).

The DSP 18 is preferably implemented with emphasis on low power. Signal processing rate may reasonably be sacrificed to enable low power continuous operation, because the bandwidth of typical sensor systems is low, for example approximately 100 Hz for a seismic vibration sensor.

Figure 4:
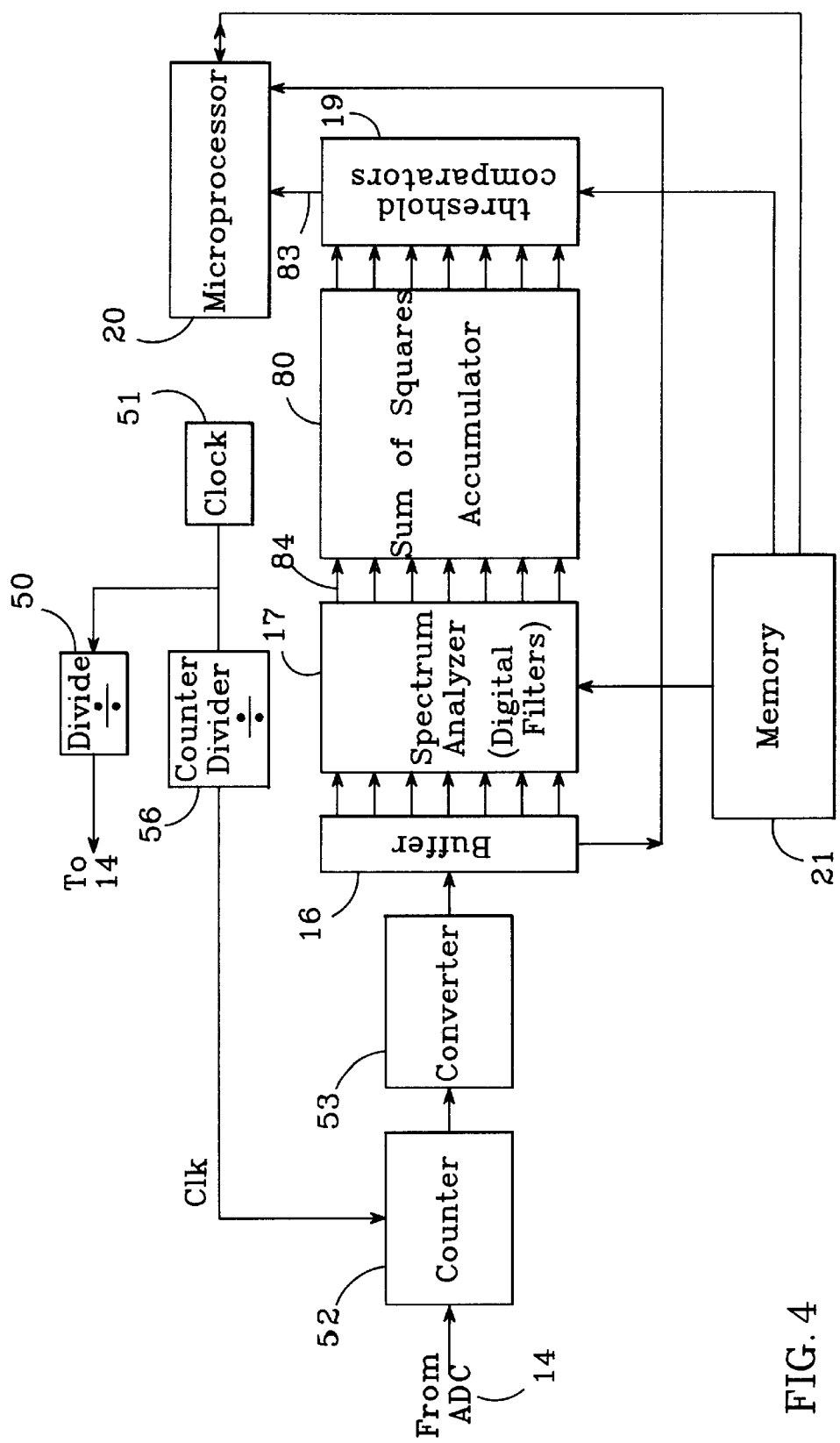
FIG. 4 is a block diagram of a digital signal processor that can be used with the invention.

FIG. 4 shows one example of an appropriate architecture for the DSP 18. In the embodiment shown, a low sampling rate, resulting from band-limited sensor response, allows the DSP unit to operate at low clock frequency (less than 100 KHz). Because the sensor signals are slowly changing, the DSP may effectively be reconfigured to reprocess the sensor signals in the event of overflow or unusual signal events. The illustrated DSP unit contains a clock divider 50 to divide a clock pulse train from clock 51 (which may operate at a frequency on the order of 100 Khz) down to a lower sampling rate which is appropriate to the sensor data of the specific application. The resulting lower clock rate is used by ADC 14 to trigger sampling of the sensor signal. The input end of the DSP can be the last stage of a Σ–Δ ADC. An up-down counter 52 counts pulses output by a Σ–Δ ADC 14. A unidirectional counter 56 controls the resolution of the ADC 14 by setting the length of time in each cycle during which counter 52 will count pulses. The output of counter 52 is then converted by converter 53 to two's complement representation with an offset of 128, for the purpose of centering the filter output around zero, and the resulting data is stored in a buffer 16.

The data stored in the buffer 16 is next processed by a spectrum analyzer 17 which is preferably a bank of digital filters. Each of the digital filters may be realized as an eight-channel, eight bit infinite impulse response (IIR) digital filter. In order to reduce the effect of truncation error, a cascaded structure of two second order IIR filters can be used, providing a four pole bandpass filter.

Figure 5:
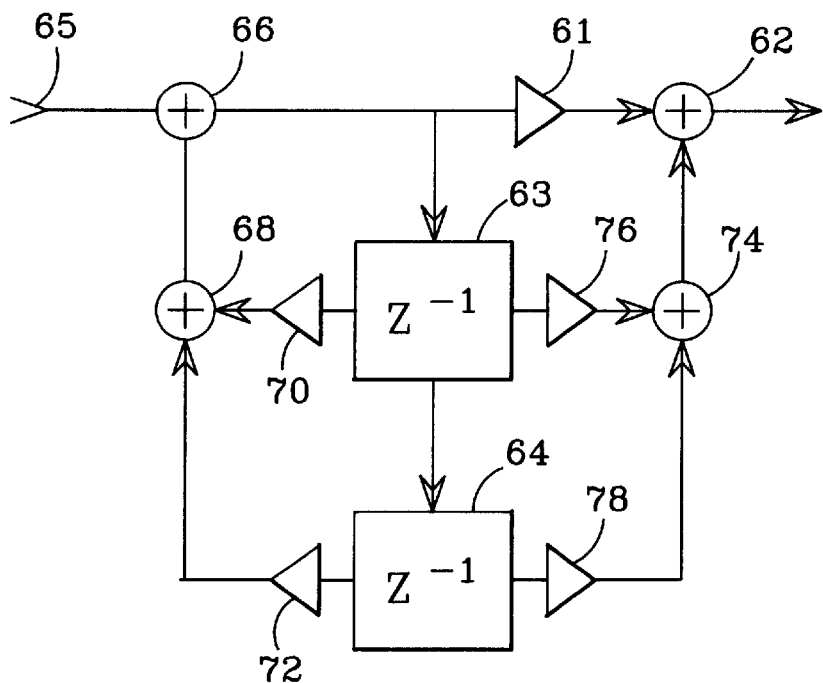
FIG. 5 is a block diagram of one realization of a four pole digital filter in IIR form that can be used in the digital signal processor to extract spectral power information from the sensor data.

FIG. 5 shows a suitable four-pole configuration, a conventional direct form II realization suitable for use as a single channel of the multiple channel digital filter bank. In accordance with common convention, each of the triangles (such as 61) indicate multiplication by a specific coefficient (stored in coefficient memory 81 on FIG. 5. Circles such as 62 with a+sign indicate a summation. Boxes such as 64 marked by $Z^{-1}$ indicate a memory register storing the input value latched in on the previous clock cycle. Thus, the input sensor data byte at an input terminal 65 is summed at a summation junction 66 with a number calculated by summing at summation junction 68 the contents of two registers 63 and 64 multiplied respectively by coefficients 70 and 72. The summed output of summation junction 66 is multiplied by coefficient 61 and summed at summation junction 62 with the output of summation junction 74, which sums the contents of registers 63 and 64, multiplied respectively by coefficients 76 and 78. The output of summation junction 66 is then clocked into register 63 at the end of the clock cycle, at which time the contents of 63 are clocked into register 64. (register 64 thus always holds the previous clock cycle's value from register 63.) The process is repeated with the next data byte in sequence.

The choice of coefficients 61, 70, 72, 76 and 78 for each channel determines the shape, bandwidth, and center frequency of the resulting filter function and may be calculated according by methods well known in the art. The coefficients for each spectral band are stored in memory 21. The microprocessor 20 can dynamically change the coefficients stored in memory 21, thus providing a way to dynamically reconfigure or program the spectrum analyzer 17.

Figure 6:
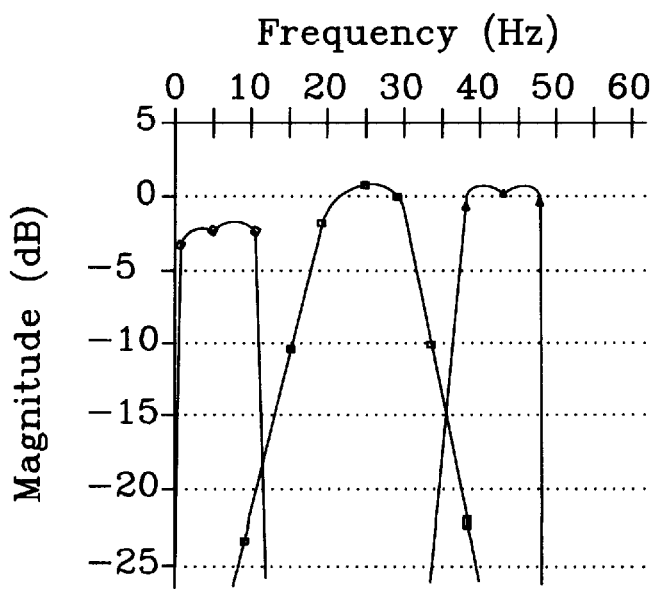
FIG. 6 is a graph showing the frequency responses of selected digital bandpass filters realized according to FIG.5 which can be used with the invention.

FIG. 6 shows the frequency response of three exemplary bandpass filters realized in the form shown in FIG. 5, each ten Hz wide, with passband center frequencies at 5Hz, 25 Hz, and 45 Hz and an input byte rate of 100 Hz.

The spectrum analyzer 17 made up of multiple channels of bandpass filters enables spectral analysis of the input signal, by producing multiple outputs 84 each representing the spectral power density within a specific frequency band. The bandpass filters may be implemented in parallel, or arithmetic units (multipliers and adders) may be shared, saving power and chip area.

The output of the spectrum analyzer 17 is preferably accumulated in a sum-of-squares (SSQ) accumulator 80 in FIG. 4, with multiple frequency slots. In one embodiment, multiplexing allows the channels of the SSQ accumulator 80 to share a single multiplier and accumulator. Multiple separate register words accumulate the SSQ values of the multiple channels respectively. After accumulation, the SSQ values are placed consecutively on an output port to the threshold comparators 19.

The threshold comparators 19 compare each of the multiple outputs of the SSQ accumulator with thresholds stored in memory 21. The multiple outputs may be compared sequentially, using a multiplexer to sequentially compare each SSQ value to the corresponding programmed threshold. If any SSQ value falls outside of programmed parameters, for example, if it is greater than or equal to its corresponding stored threshold value, an interrupt bit 83 is set to request attention from the microprocessor 20 (also shown in FIG. 3). The power spectral densities accumulated by accumulator 80 and/or the time domain data stored in buffer 57 are also made available to the microprocessor 20 on demand from the microprocessor.

The above described apparatus for comparing an analyzed spectrum to a profile provides a way of identifying signals. For example, large heavy vehicles producing a distinctive low frequency rumble can be distinguished from other types of signal sources by reference to a pre-programmed frequency profile. In other applications, for example industrial control, it may be desirable to detect when a signal falls below a threshold, as for example when a motor fails; the threshold comparators 19 would in that case be configured to produce an interrupt output when the signal falls below the appropriate threshold.

The digital bandpass filter spectrum analyzer described above offers a simple and low power method of signal analysis; however, other methods including but not limited to Fourier transform and wavelet analysis are also possible and are within the scope of the invention. The spectrum analysis could be performed by microprocessor 20 in some embodiments, or by a separate microprocessor provided for that purpose. Such variations are also within the scope of the invention.

C. The Microprocessor:

The microprocessor 20 provides essential control, logic, and programming functions for the node. In addition to making decisions based upon the sensor data, it handles multiple tasks including communication scheduling, topology learning for the network, maintenance and updating of routing tables, calculation of range relative to neighbor nodes or targets, storage of data and relaying of communications between nodes and to or from a user 34.

All of the functions involved in communication scheduling and topology learning are controlled by the (at least one) node microprocessor. The microprocessor at each member node may, for example, have stored matrices identifying other network member nodes, their connecting communication links and scheduled time slots for transmission and reception, and their locations.

The microprocessor 20 may be any of a number of suitable commercially available microprocessors, but should preferably be chosen for low power and flexible power management functions, low cost, and adequate processing capability. For example, candidates would include the AMD "186ER," available from Advanced Micro Devices Corp., or a low power "80186" family processor from Intel. The microprocessor should preferably be capable of temporarily operating in a low power, "sleep" mode, from which it can be "awakened" by an interrupt (generated from, for example, detection of an interesting signal). An application specific processor could be used; in such a case the design should emphasize low power and the ability to exploit low duty cycle by use of a "sleep" mode. When awakened from "sleep" mode by detection of a signal the microprocessor can make a decision regarding the signal and the appropriate course of action—whether to warn other nodes, increase data acquisition, check other spectral signatures, etc. The microprocessor should preferably also be capable of scheduling and controlling RF communications and of enabling/disabling RF and other circuits as the situation demands. If appropriate, the microprocessor may route the spectral density information from the DSP 18 and/or the buffered time domain sensor data to the RF transceiver 22 for transmission to the network. The microprocessor 20 can also control uploading or coefficients for the DSP 18 and thus may reconfigure the DSP dynamically, in response to conditions, data, received instructions or programming. For example, the microprocessor 20 can upload coefficients from the memory 21 (typically on-chip memory integral to the microprocessor) into the DSP 18 to narrow or widen the spectral region of focus, move the center frequencies (by modification of the coefficients), or load a new threshold profile for comparison with the signal. This allows the node to cooperate with other nodes in concerted tasks or data acquisition, or to modify its data processing based on the current characteristics of the sensor data.

Figure 7:
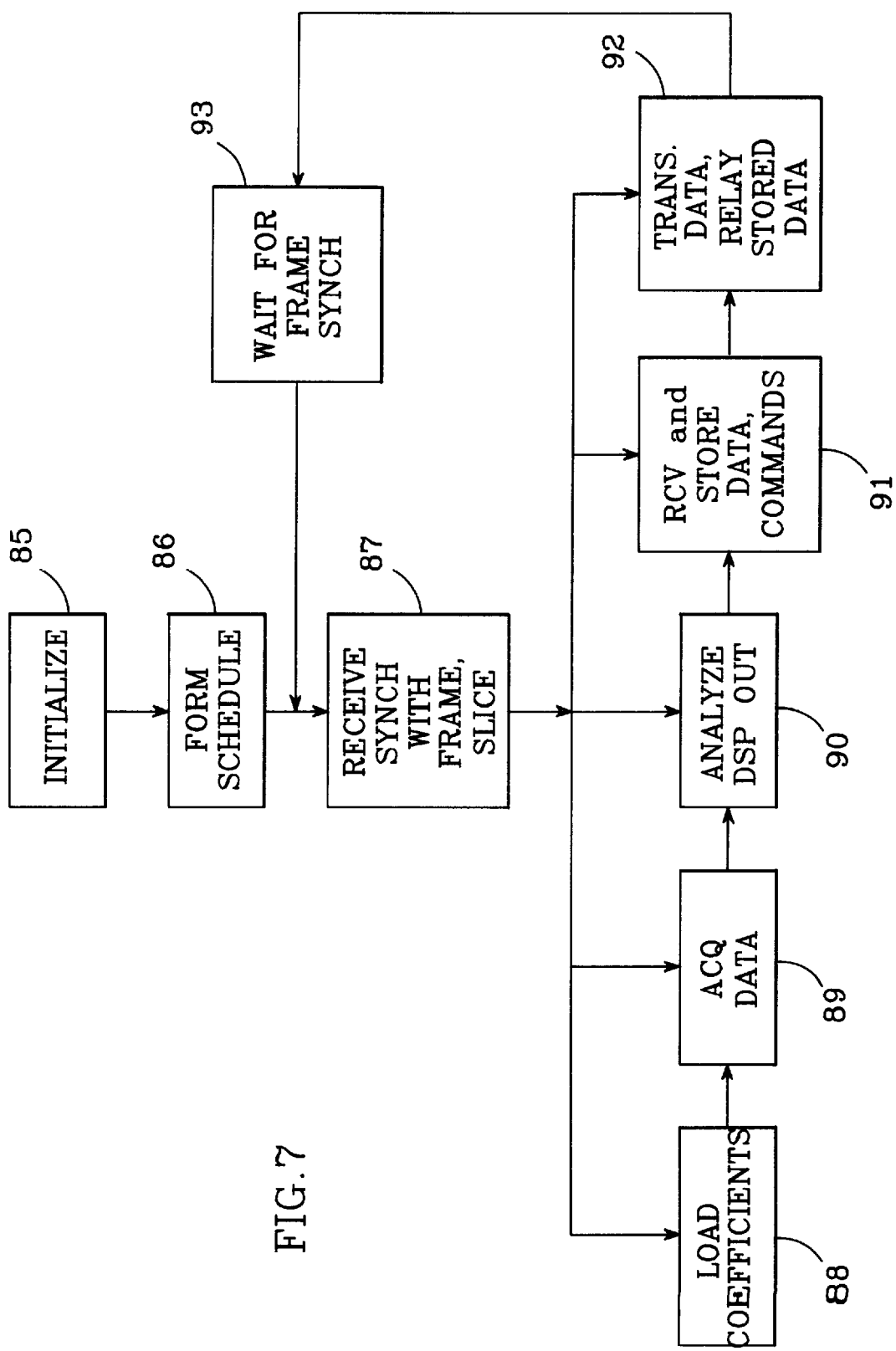
FIG. 7 is a flow chart showing the control activities performed by a microprocessor used in the invention.

FIG. 7 shows a sequence which can be used by the microprocessor 20 to allow the node to function in a synchronized TDMA communication scheme. The microprocessor begins by initializing processes (85) including its internal registers, pointers, memory and I/O addressing functions. Next the microprocessor 20 forms a schedule (86) for communications with neighbors. In a simple embodiment, the microprocessor 20 might consult a pre-stored schedule for initial time slot activity scheduling information. For example, the microprocessor on an individual node may compare a pre-stored identity to a pre-programmed master table or schedule to determine what time slots in a TDMA scheme are allocated to that node. In more complex self-organizing embodiments, forming a schedule may require topology learning and communication slot allocation, as discussed below ("E. Network organization").

Figure 8:
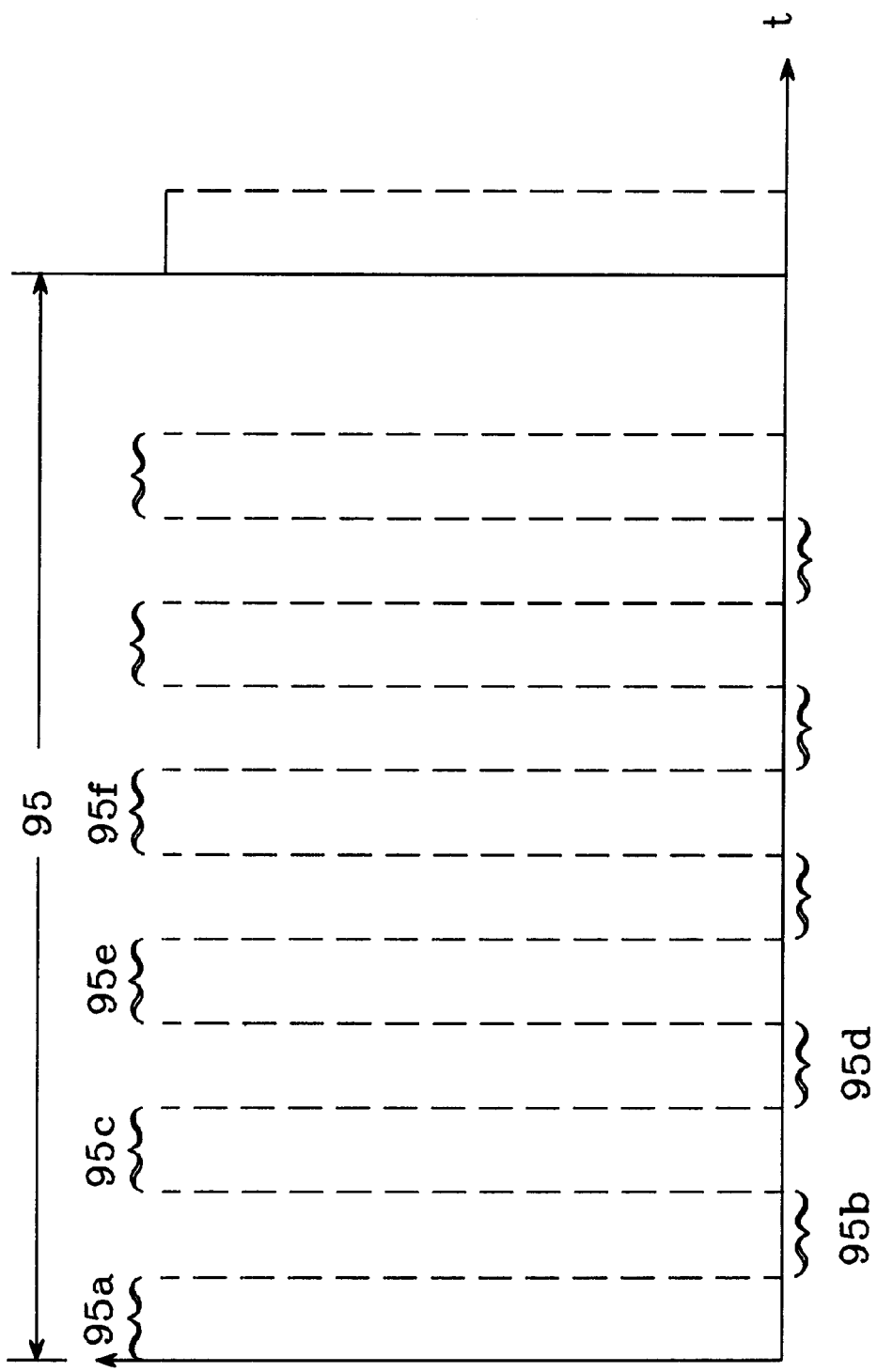
FIG. 8 is a timing diagram showing a possible subdivision of a repeating time frame which can be used by the invention to allow multiple access node communications.

FIG. 8 shows a generalized timing diagram of a TDMA scheme which may be used by the invention to schedule node activities. Node activities including communication are scheduled in a repeating time frame 95, broken up into shorter time slices such as 95*a–d*. Specific nodes are scheduled to transmit and receive during respective specific time slices. For example, a microprocessor on a given node may be scheduled to transmit data in slice 95*c* and receive data in slice 95*d*. A frame synch slice 95*a* is defined by a previously programmed command which is recognized by the nodes, to allow the nodes to achieve synchronization. Other synchronization slices such as synch slices 95*e* and 95*f* may also be provided, to aid in maintaining timing synchrony within the frame 95.

Referring again to FIG. 7, after initialization 85 the microprocessor 20 forms a schedule (86), then sets transceiver 12 to listen for the frame synch slice 95*a*. When frame synch slice 95a is received the microprocessor 20 sets an internal timer to and commences the appropriate activity according to its schedule (86). For example, if the particular node is not scheduled to receive or transmit in the upcoming slice, it would load DSP coefficients (88), then acquire sensor data (89), analyze the DSP output (90) (including detecting any alarm conditions output by threshold comparators 19); then, during the appropriately scheduled slices the microprocessor enables the transceiver to receive data and commands (91) and to transmit (92) data, including alarm conditions and relayed messages and commands to other nodes. The microprocessor then waits (93) for the next frame synch 95*a* and repeats the activities 88–93 in a loop.

D.) The RF Transceiver:

In a preferred embodiment, an RF transceiver 22, under control of the microprocessor 20, provides bidirectional communication between a node and other nodes or users, for communicating data, decisions, programming or routine network protocol maintenance information. The transceiver should preferably have the ability to assume a low power consuming "off" mode when it is not needed in a time slot, so that power can be conserved in a TDMA communication scheme.

Figure 9:
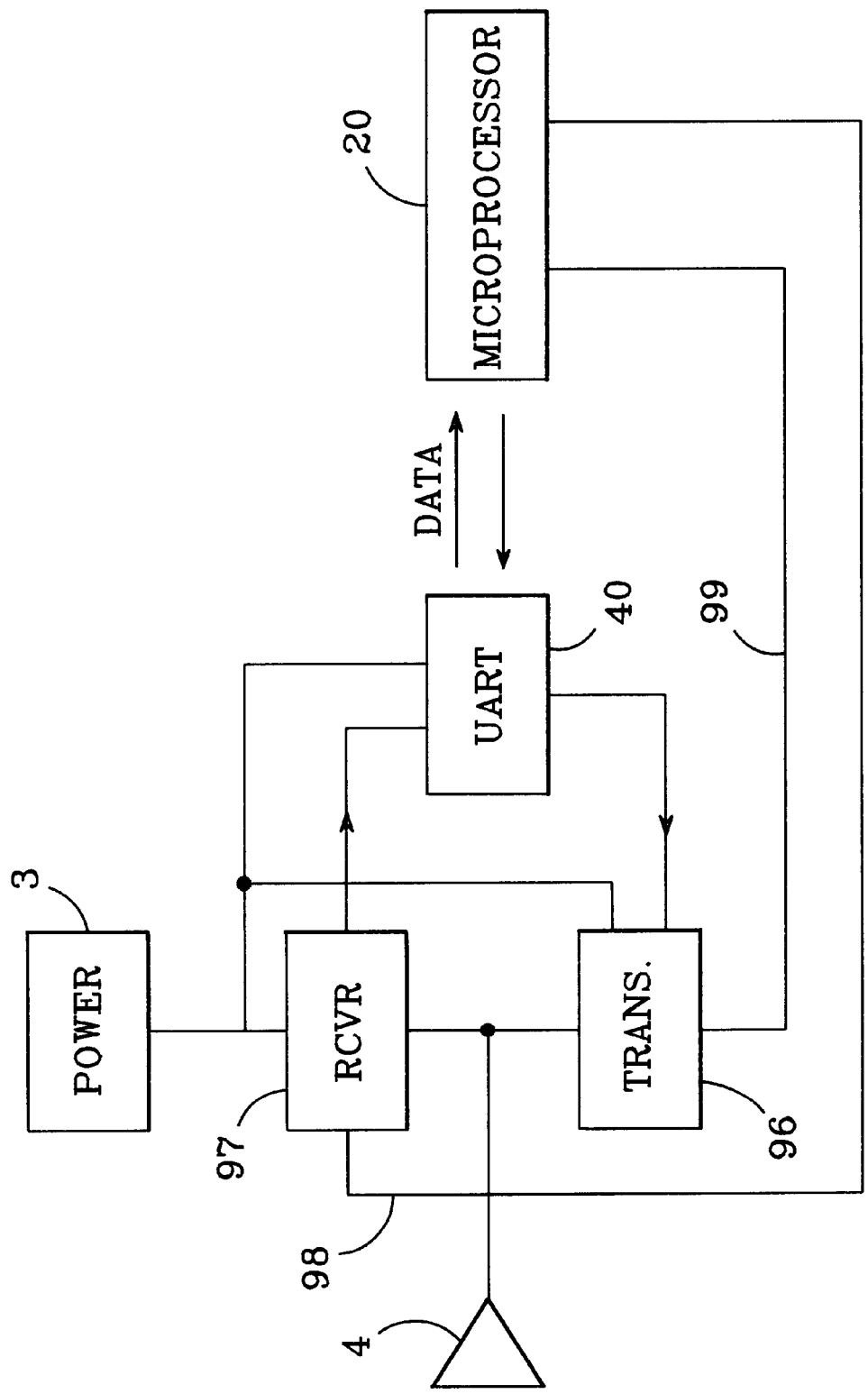
FIG. 9 is a block diagram of a wireless transceiver which can be used with the invention.

As shown in FIG. 9, the transceiver 22 includes a transmitter 96 and a receiver 97, which share an antenna 4 and power supply 3 (typically batteries). Transmitter 96 and receiver 97 are enabled/disabled by respective enable signals 98 and 99 from microprocessor 20; a universal asynchronous receiver/ transmitter (UART) controller 40 (for example, the MAX3243CAI chip available from Maxim) handles data transfer between the receiver 97, the transmitter 96 and microprocessor 20. The receiver design should preferably provide low noise and high selectivity while maintaining low power requirements. For some protocols, the receiver should be able to operate during some period at high duty cycle to enable each node to capture randomly arriving signals.

Conventional highly integrated transceivers are available which are suitable for use in the invention. For example, commercially available chipsets would include the Rockwell Digital Cordless Telephone (DCT) chipset, based around the R900DCTM-4 or R900DCTM-3 transceiver modules. These highly integrated transceiver integrated circuits (ICs) are suitable for operation in the 902 to 928 MHz. band, and with suitable accompanying chips, commercially available from the same source, are capable of digital spread spectrum (DSS) operation. Other commercially available ICs which are suitable for use in the invention include the RX2010 receiver and HX2000 or AT1000 transmitters all from RF Monolithics, Inc. Whichever RF ICs are used, they should preferably be chosen for small size, low quiescent and peak power consumption, and short turn on/turn off times. It is most preferred that the transceiver electronics be integrated with the sensor, microprocessor, and signal processing electronics.

Although the invention is primarily discussed in the context of radio communicating wireless node, the medium of communication could be any other wireless medium, including infrared, optical, acoustic, microwave, or ultrasonic waves. Various means of modulation are all possible and within the intended scope of the invention.

E. Network Organization:

At the network level, the invention employs various techniques to minimize power consumption by the nodes and to exploit the large numbers of nodes and their density of placement. Along with the low frequency of sensor data and the more or less permanent placement of the nodes, these factors weigh in favor of a network using multi-hop routed communication within a complex topology of overlapping wireless communication neighborhoods.

In an environment of densely placed nodes, low transmission power is advantageous. It is often more power efficient to relay a message via multiple relayed low power transmissions (referred to as "multihops") rather than one high powered long range transmission. This is a consequence of the variation of radiation intensity with distance from the transmitter, which takes the form of an inverse square or higher power function, depending on terrain. In ideal terrain, assuming a minimum inverse square attenuation, ten short, straight line path transmissions of distance d require only one tenth the power of one long transmission across $10d$ (assuming omnidirectional antennas). With real terrain effects the difference is generally even more pronounced. It is therefore preferred that each transmitter operate at a power level not in excess of that required to reach only a small subset of the other nodes, relying on relayed transmissions to span the network. This also enables channel reuse by nodes out of range of one another, conserving bandwidth. Low transmission power levels also provide low probability of interception and low probability of detection, both desirable in some applications.

A synchronous multi-access protocol such as TDMA is preferred to schedule communications within the network. In this method, multiple nodes are synchronized in a repeating time frame, the parameters of which are stored in memory on or associated with the respective microprocessors 20 on each of the multiple nodes. As previously discussed, the time frame is divided into shorter time slices, which can serve as channels. For example, the transceiver on a specific node can be caused to transmit by that node's microprocessor 20 during a programmed time slot. Other nodes within transmission range of the transmitting node are controlled by their microprocessors 20 to receive data via their respective transceivers 22 during the same time slot. If the received data is earmarked for another destination node (such as a user interface node) the receiving node is controlled by its microprocessor 20 to store the message (for example in memory 21) and relay the message by re-transmitting the data through transceiver 22 during another assigned time slot. In this way data is relayed through the network and routed toward its destination, usually a node which is accessible to a user.

TDMA is advantageous in a low powered network, since both transmitters and receivers can be idled in an off or power conserving state during time intervals when not required. However, the programmability of the node microprocessor enables many other methods of organizing access to the communication medium which are also within the intended scope of the invention, including code division multiple access (CDMA) and frequency division multiple access (FDMA) as examples.

In some applications of the invention the locations of the nodes may not be known in advance of deployment, and it is highly desirable to learn the communication topology of the network which results from placement and terrain. Furthermore, in some applications it may be most desirable to operate in a distributed manner, controlled from multiple nodes, rather than from a central location. This protects the network from jamming, interference, and accidental or intentional destruction. The resulting network controls are widely distributed so the network can reconfigure to adapt to changing conditions.

In the invention, microprocessor 20 can be programmed to learn the topology and routing needs of a network, either autonomously or with user input. A variety of conventional methods may be programmed, including the "layer net protocol" suggested by A. Bhatnagar, "Layer Net: A New Self-Organizing Network Protocol," *I.E.E.E. Military Communications Conference Record*, Vol. 2, pp. 845–49 (1990), or that described by A. Ephremides, "A Design Concept for Reliable Mobile Radio Networks with Frequency Hopping Signaling," *Proceedings of the I.E.E.E.*, vol. 75, no. 1, pp. 56–73 (1987). If a TDMA access method is used, time slots within a repeating time frame can be allocated by conventional methods such as the "Unifying Slot Assignment Protocol" (USAP) described by C. David Young, "USAP: A Unifying Dynamic Distributed Multichannel TDMA Slot assignment Protocol," *I.E.E.E. Military Communications Conference Record*, Vol. 1, pp .235–39 (1996).

The aforementioned methods provide examples of distributed, autonomous methods for organizing the network communications, but in some applications even simple methods such as direct assignment of channels by a user may be useful and appropriate.

While particular embodiments of the invention have been shown and described, numerous variations and alternate embodiments will occur to those skilled in the art. Accordingly, it is intended that the invention be limited only in terms of the appended claims.

We claim:

1. An electronic communicating and sensing station, comprising:

a sensor which provides an output indicative of a sensed condition, a digital signal processor, coupled to receive the sensor output and configured to compare characteristics of the sensor output to a stored set of characteristics, and producing an output based upon said comparison, a programmable microprocessor coupled to said digital signal processor to evaluate its output, a wireless transmitter that is controlled by said programmable microprocessor, to transmit information about the sensed condition, and a wireless receiver that is controlled by said programmable microprocessor to receive data and instructions for programming said programmable microprocessor; wherein said transmitter and receiver operate in a plurality of communication channels that are defined time periods, subdivisions of a longer periodically repeating time frame.

2. The station of claim 1, wherein said programmable microprocessor is programmed: (a) to enable said wireless receiver to receive data during a defined time period, (b) to store data that is received during said time period, and (c) to cause said wireless transmitter to transmit the data during a later defined time period.

3. An electronic communicating and sensing station, comprising:

a sensor which provides an output indicative of a sensed condition, a digital signal processor, coupled to receive the sensor output and configured to compare characteristics of the sensor output to a stored set of characteristics, and producing an output based upon said comparison, a programmable microprocessor coupled to said digital signal processor to evaluate its output, a wireless transmitter that is controlled by said programmable microprocessor, to transmit information about the sensed condition, a wireless receiver that is controlled by said programmable microprocessor to receive data and instructions for programming said programmable microprocessor;

a data buffer for storing data from said sensor, a spectral analyzer which operates on the data in said data buffer, to compute a power spectral density in at least one spectral band, and one or more comparators, each comparing the power spectral density in a respective spectral band computed by said spectral analyzer with a respective stored power spectral density and producing an output signal when said power spectral density exceeds said stored power spectral density, the output signals from said comparators together forming the output of said digital signal processor.

4. The station of claim 3, wherein said sensor, said digital signal processor, said microprocessor, said wireless transmitter and said wireless receiver are integrated on a common substrate.

5. The station of claim 3, wherein said spectrum analyzer comprises at least one digital filter which operates on the contents of said data buffer and computes a filtered data output representing signal components from said sensor in a selected spectral band.

6. The station of claim 5, further comprising:

a sum-of-squares accumulator, which operates on the filtered data output of said digital filter, squares the filtered data output from said digital filters and accumulates the squared filtered data output over a time interval to obtain an average power spectral density for application as an input to said comparators.

7. The station of claim 3, wherein said microprocessor operates at a low power when the outputs from said comparators are below a predetermined threshold, and operates at a higher power level when the output from at least one of said comparators exceeds said threshold.

8. An electronic communicating and sensing station, comprising:

a digital signal processor, adapted to receive a signal indicative of an environmental condition and configured to compare characteristics of the sensor output to a stored set of characteristics, and producing an output based upon said comparison, a programmable microprocessor coupled to said digital signal processor to evaluate its output, a wireless transmitter that is controlled by said programmable microprocessor, to transmit information about the environmental condition, and a wireless receiver that is controlled by said programmable microprocessor to receive data and instructions for programming said programmable microprocessor; wherein said digital signal processor comprises:

a data buffer for storing data from said sensor, a spectrum analyzer which operates on the data in said data buffer, to compute a power spectral density in at least one spectral band, and one or more comparators, each comparing the power spectral density in a respective spectral band computed by said spectrum analyzer with a respective stored power spectral density and producing an output signal when said power spectral density exceeds said stored power spectral density, the output signals from said comparators together forming the output of said digital signal processor.

9. A network of electronic communicating and sensing stations, comprising at least two stations, a first station and a second station, each comprising:

a sensor which provides an output indicative of a sensed condition, a digital signal processor, coupled to receive the sensor output and configured to compare characteristics of the sensor output to a stored set of characteristics, and producing an output based upon said comparison, a programmable microprocessor coupled to said digital signal processor to evaluate its output, a wireless transmitter that is controlled by said programmable microprocessor to transmit information about the sensed condition, and a wireless receiver that is controlled by said programmable microprocessor to receive data and instructions for programming said programmable microprocessor;

wherein said second station is arranged to communicate with said first station by receiving said information by said wireless receiver; and wherein said digital signal processor comprises:

a data buffer for storing data from said sensor, a spectrum analyzer which operates on the data in said dati buffer, to compute a power spectral density in at least on( spectral band, and one or more comparators, each comparing the power spectral density in a respective spectral band computed by said spectrum analyzer with a respective stored power spectral density and producing an output signal when said power spectral density exceeds said stored power spectral density, the outputs from said comparators together forming the output of said digital signal processor.

* * * * *